July 23, 1935.  A. P. DE SEVERSKY  2,009,356
AIRCRAFT ANCHOR
Filed Dec. 22, 1931  2 Sheets-Sheet 2
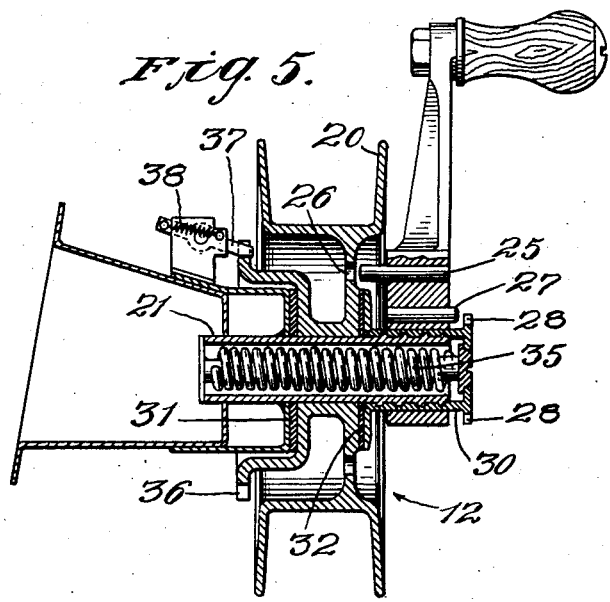
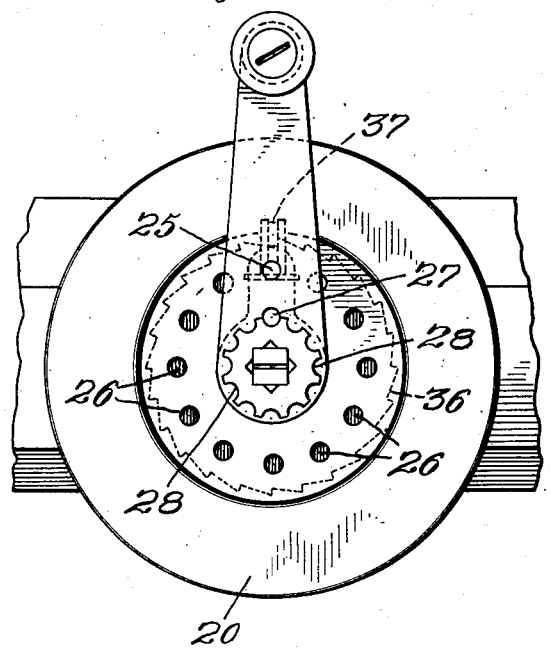
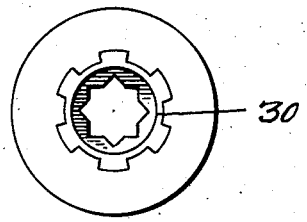
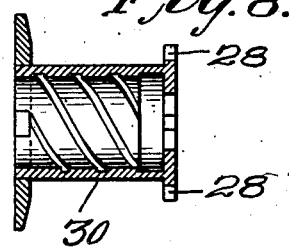
INVENTOR
BY Alexander P. de Seversky
Maurice B. Landers
ATTORNEY Patented July 23, 1935

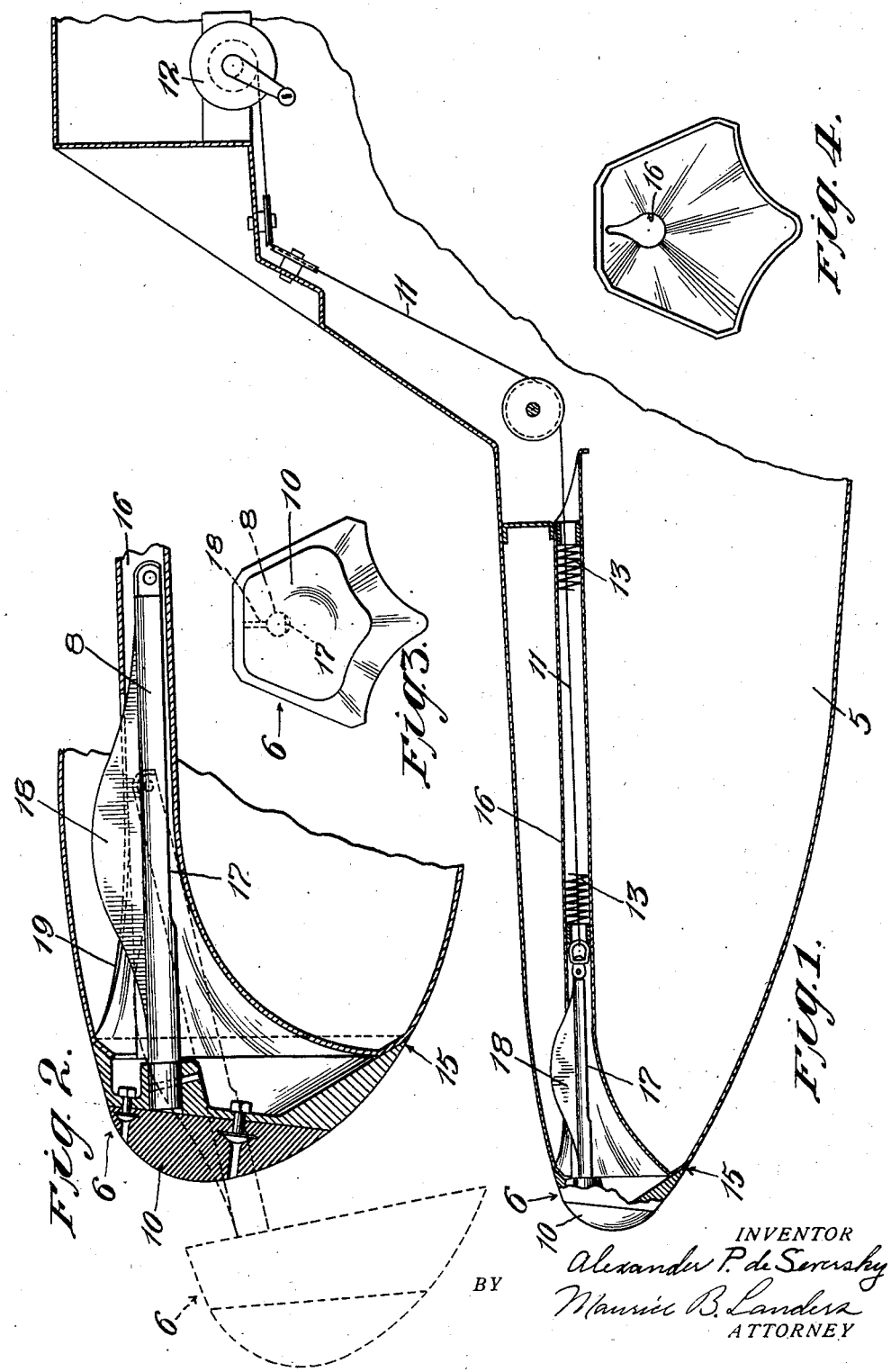

2,009,356

REISSUED

UNITED STATES PATENT OFFICE 2,009,356

AIRCRAFT ANCHOR

Alexander P. de Seversky, New York, N. Y., assignor to Seversky Aircraft Corporation, Farmingdale, N. Y., a corporation of Delaware Application December 22, 1931, Serial No. 582,552

5 Claims. (Cl. 244—2)

The present invention relates to aircraft and has for an object to provide an improved anchor arrangement for use with such aircraft.

An effective anchor is a necessary part of the equipment of a hydro-aeroplane and is sometimes a desirable part of the equipment of aircraft of other types. In view of the high wind resistance of aircraft as compared with boats a relatively heavy anchor is necessary and yet it is desirable to add as little as possible to the weight of the craft.

The present invention provides an arrangement in which the anchor constitutes a structurally unitary part of the craft when in flight, an arrangement which economizes weight and avoids adding to the wind resistance on account of the anchor and anchor fittings. In the preferred form the anchor forms when retracted a stress resisting bumper for the craft.

In the preferred embodiment of the invention the anchor forms a part of the bow of the craft and it is made in part of rubber or other resilient material to constitute a bumper for yieldably resisting shocks, as for example when the craft taxies into a dock or an obstruction.

The nature and objects of the invention will be better understood from a description of a particular illustrative embodiment for the purpose of which description reference should be had to the accompanying drawings forming a part thereof and in which:

Figure 1 is a diagrammatic view of an embodiment of the invention,

Figure 2 is a detail cross-sectional view of the anchor in position in the body of the craft, Figure 3 is a front view of the anchor, Figure 4 is a perspective view of the anchor receiving recess, Figure 5 is a cross-sectional detail view of the winch, Figure 6 is a side view of the winch, and, Figures 7 and 8 are detail views of the brake sleeve.

In the arrangement shown for the purpose of illustrating the principles of the invention, a hydro-aeroplane is provided with an anchor which is retractable into the body of the craft and when so retracted continues the streamline contour. Preferably the anchor when in retracted position forms a structurally unitary part of the craft and constitutes a part of the stress resisting makeup of the craft.

Referring to the particular structure illustrated the body 5 which may be the streamline fuselage, pontoon or the like, is formed to carry at its forward end an anchor 6 which may be retracted into position securely against the bow of the body with the shank 8 projecting into a suitable recess while the anchor head 10 forms the bow. The exposed face of the anchor is formed to continue the streamline contour of the part against which or into which it is retractable whether the streamline contour is afforded by the main structure or by a stream lining shell of light weight construction. A suitable cable 11 is secured to the free end of the shank and leads to a winch 12, operable to pay out or draw in the anchor. The housing for the shank of the anchor carries a coil spring 13 which is compressed when the anchor is retracted and which projects the anchor from the housing when the winch is released for this purpose.

The anchor is shown as of the mushroom type with the head constituting the bottom engaging element and formed to provide a generally circular relative sharp edge 15 which will sink into sand or gravel to provide an effective grip. The head is preferably mounted eccentrically on the shaft so that as the anchor is drawn into the body and the shank approaches a horizontal position the weight of the head will tend to rotate the anchor to normal upright position. The shank is shown as sufficiently round to permit the another to rotate in the guideway 16 into which it is drawn by the cable 11 but it may be somewhat flattened on its underside as indicated at 17 to inhibit oscillation after it comes to position. If desired provision may be made for more positively guiding the anchor to the desired upright position either as an addition to or as an alternative for the gravity arrangement. In the particular structure shown the rib or fin 18 is formed on the anchor shank and a corresponding recess 19 is formed with guides engageable with the fin to turn it gradually toward the final position. The arrangement of the fin and recess however permit free rotation of the shank toward normal position, especially during the earlier part of the retracting movement. It is to be noted that the retractile movement of the anchor is such that sand or gravel caught in the mushroom head and any water will fall out under the influence of gravity before the anchor seats against the end of the boat or pontoon body.

The head 10 of the anchor may consist of a metal casting and secured thereto a resilient bumper member of rubber or other resilient material designed to protect the craft against the force of collision. The outer face of the whole head is formed to continue the streamline contour of the body against or into which it is retracted.

The winch 12 is shown as comprising a drum 20 rotatably mounted on a fixed sleeve 21. An operating handle 22 is slidable toward and from the drum. In its inner position a pin 25 carried by the handle engages one of the holes 26 in the web of the drum for actuating the drum. In its outer position a pin 27 engages one of the notches 28 in a brake operating sleeve 30 threaded onto the fixed sleeve 21. The thread shown is a fast thread to prevent locking of the brake when the anchor is running out. The sleeve 30 carries at its inner end a brake disc 31 between which and an opposite brake disc 32 the hub of the drum is clamped with a braking action to avoid racing of the anchor when released. A coil spring 35 within the fixed sleeve 21 tends to rotate the brake operating sleeve to release the brake when said sleeve is not engaged by the operating handle.

A ratchet 36 is engaged by a pawl 37 to hold the anchor positively against outward movement in any position. This pawl is held in operative or inoperative position by an over center spring 38.

The arrangement described saves weight in the craft by providing for using a necessary part of the craft for an anchor while the construction is such that little if any weight is added to the bow structure.

The particular arrangement described is illustrative merely and is not intended as defining the limits of the invention. It will be understood that the anchor could form a part of another portion of the aircraft, as for example, the spreader strut between the pontoons, or the wing, etc., without departing from the spirit of the invention as defined in the claims.

I claim:

1. An anchor for aircraft comprising a body engaging element having formed as a part thereof a resilient bumper so positioned that when said anchor is supported in an aircraft said bumper will cushion shocks of objects with which said aircraft may collide.

2. An aircraft comprising a body portion, and an anchor retractable against the bow of said body the forward face of said anchor when retracted against the body being of resilient material to absorb shocks.

3. An aircraft comprising a body portion and an anchor having a shank and a head thereon retractable against said body portion and forming a structurally unitary part of said body with its exposed outer contour when retracted shaped to continue the contour of said body, the shank of the anchor and said body being formed with interengaging guiding means to insure the desired positioning of the anchor when retracted into the body.

4. An aircraft comprising a body portion and an anchor having a shank and a head thereon retractable against said body portion and forming a structurally unitary part of said body with its exposed outer contour when retracted shaped to continue the contour of said body, the shank of the anchor being excentric to the center of gravity of the anchor head and being freely rotatable in the body during a portion of the retracting movement into the body whereby the anchor assumes the desired position under the action of gravity.

5. An aircraft comprising a body portion and an anchor having a shank and a head thereon retractable against said body portion and forming a structurally unitary part of said body with its exposed outer contour when retracted shaped to continue the contour of said body, the shank of the anchor being formed with a fin and the body being formed with a guiding means engageable with the fin to turn the anchor to predetermined position.

ALEXANDER P. DE SEVERSKY.